UNITED STATES PATENT OFFICE.

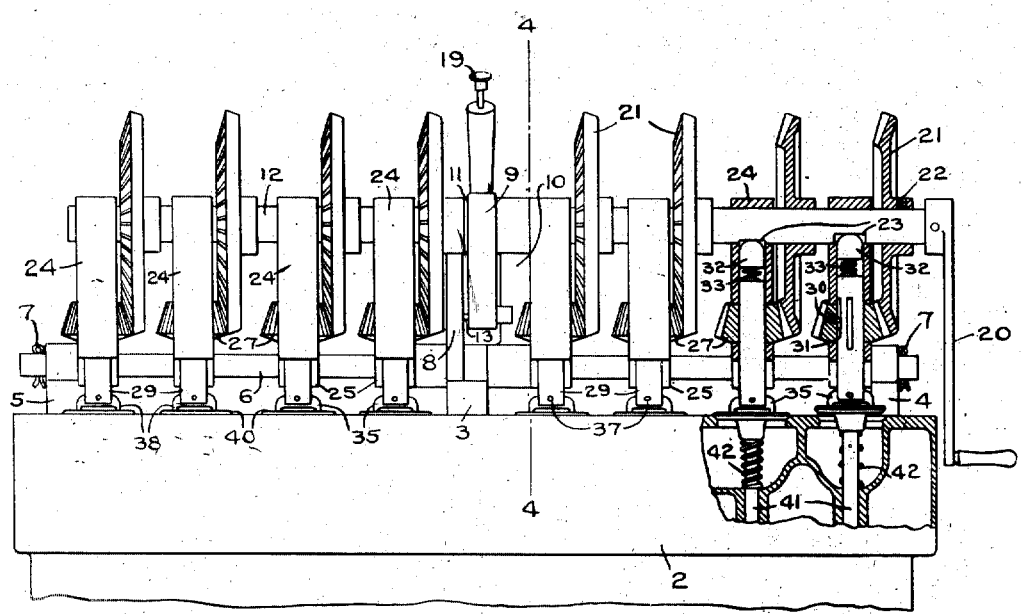

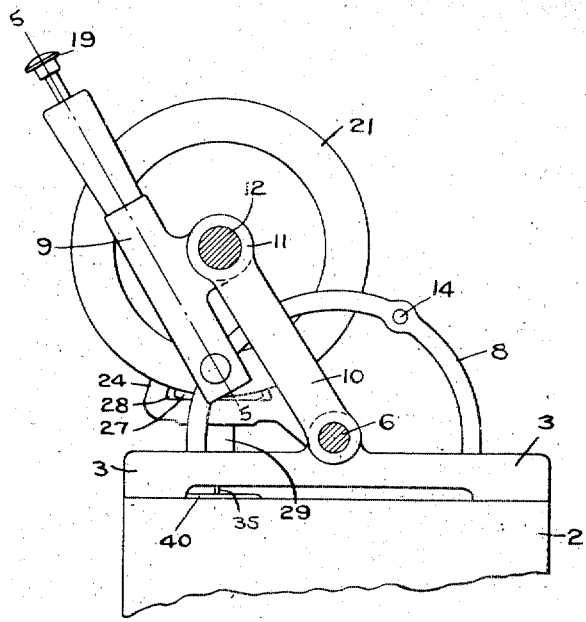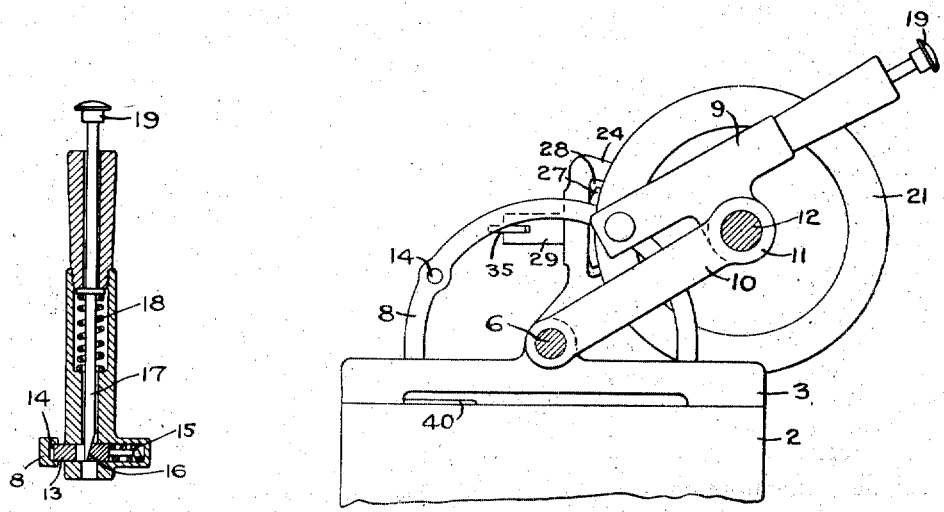

THOMAS V. CUDMORE, OF AUSTIN, MINNESOTA.

VALVE-GRINDING MACHINE.

1,252,406.  Specification of Letters Patent.  Patented Jan. 8, 1918.

Application filed April 30, 1917. Serial No. 165,425.

*To all whom it may concern:*

Be it known that I, THOMAS V. CUDMORE, a citizen of the United States, resident of Austin, county of Mower, State of Minnesota, have invented certain new and useful Improvements in Valve-Grinding Machines, of which the following is a specification.

My invention relates to machines for grinding the valves of a gas engine and particularly those of the Ford type, and the object of the invention is to provide a device by means of which all the valves can be easily and quickly ground. Generally it takes hours to properly grind the valves of an engine, but with my apparatus the same operation can be performed in a few minutes.

A further object is to provide a grinding machine of comparatively simple construction and one which can be easily and quickly mounted on the cylinders.

The invention consists generally in various constructions and combinations, all as hereinafter described and particularly pointed out in the claims.

In the accompanying drawings forming part of this specification,

Figure 1 is a side elevation, partially in section, of the upper portion of a cylinder with my invention applied thereto, Fig. 2 is an end elevation of the same, showing the device in its working position, Fig. 3 is a detail sectional view, showing the manner of connecting the grinding device with the valve, Fig. 4 is a sectional view on the line 4—4 of Fig. 1, Fig. 5 is a sectional view on the line 5—5 of Fig. 4, Fig. 6 is a vertical sectional view, showing the machine mounted on the cylinder but in its non-working position.

In the drawing, 2 represents the upper portion of a gas engine. In applying my device to this engine I have illustrated an engine of the Ford type, as the machine is particularly adapted for an engine of that kind, although it may be used for the same purpose on other gas engines. The cylinder head of the engine is first removed and in place thereof I mount my machine, a central block 3 and end blocks 4 and 5 being provided and seated on the engine in place of the cylinder head and secured in the same manner as the cylinder head, as indicated by dotted lines in Fig. 2. Thus no special clamps or securing means are necessary for my attachment, the fastening bolts or screws entering the sockets in the cylinder that are provided for the bolts of the cylinder head. The blocks 3, 4 and 5 have bearings for a shaft 6 held against longitudinal movement by suitable means, such as cotter pins 7.

A guide 8 is mounted on the block 3 and a bracket 9 has an arm 10 journaled on the shaft 6 and provided with a bearing 11 in which a second shaft 12 is journaled. The bracket 9 is free to rock on the shaft 6 as a center and in the lower portion of said bracket is a pin 13 adapted to fit into sockets 14 in the guide 8 and yieldingly held toward said sockets by the tension of a spring 15. This pin has a beveled surface 16. A plunger 17 is mounted to slide in said bracket and is normally held in its raised position by the tension of a spring 18. A finger grip 19 is provided on the plunger and when it is depressed the pin 13 will be withdrawn from its socket in the guide to allow the bracket and the shaft 12 to be swung from one end of the guide 8 to the other, or from the position shown in Fig. 4 to that illustrated in Fig. 6, or vice versa.

This bracket 9 and the guide are preferably located about midway between the ends of the shafts 6 and 12, where the apparatus can be conveniently tilted from side to side. The shaft 12 is provided with an operating crank 20 and secured on the shaft at intervals are a series of beveled gears 21 held in place by set screws 22 or other suitable means. Adjacent to each of these gears the shaft 12 is provided with transverse notches 23 which are progressively arranged around the circumference of the shaft. A series of brackets 24 are secured at 25 on the shaft 6 and have bearings on the shaft 12 and in these brackets sockets 26 are formed. Beveled pinions 27 fit within these recesses 28 in the brackets 24 and are splined on studs 29 which have a limited movement in said pinions by means of set screws 30 and key-seats 31. The upper ends of the sockets 26 are provided with caps 32 which bear on the surface of the shaft 12 and compression springs 33 are interposed between these caps and the upper ends of the studs 29 for holding said studs in a depressed position with a yielding pressure, the caps 32 being positioned to enter the notches in the shaft 12 and allow the studs 29 to move upwardly with each revolution of the shaft.

The lower ends of the studs 29 have sockets 34 and jaw plates 35 fit loosely within these sockets and are held therein by means of slots 36 and pins 37 which permit a longitudinal and rocking movement of the plates. Each end of the plate is provided with a lug 38 to enter the holes 39 provided in the upper surface of each valve disk 40, these sockets being formed in the valves when they are turned out at the factory. The valve stem 41 has a spring which normally holds the valve in its closed position, and resists opening of the same through the movement of the crank shaft.

Preparatory to grinding the valves, I remove them and place the springs 42 on the stems just beneath the disks, where their tension will be exerted to hold the valves in an open position, as indicated in Fig. 1.

In using the device, the blocks are first secured to the engine in place of the cylinder head and the shaft 12 swung to its working position, as indicated in Fig. 4. When so adjusted, the studs 29 will be above the valves, one for each valve, and the jaw plates 35 will be positioned so that the lugs thereon will enter the holes in the valve disk. The operator will then grasp the crank 20 and turn the shaft 12. In so doing the caps 32 will follow the surface of the shaft 12 and with each revolution of the shaft will drop into the notches 23 and allow the valve connected with that particular stud which is allowed to raise, to be lifted off its seat by the tension of the spring 42, while continuing to rotate through the gear 21 and pinion 27. As soon as the cap 32 passes out of the notch in the shaft 12, the stud 29 will again be depressed and force the valve disk down upon its seat and upon the oil and emery mixture usually employed for re-grinding a valve of this kind.

The notches 23 are differently positioned in their shaft to allow the valves to raise alternately or in rotation, in substantially the same manner as they would be raised by the operation of the cam shaft. In this way I am able to affect the opening and closing of the valves and the shifting of their position on the seats without the necessity of removing the cam shaft, although it may be taken out of the engine, if preferred. Whenever a valve disk is raised and a stud depressed, its position on its seat will be changed slightly, due to its continued rotation. There will never be any possibility, therefore, of grit or any hard foreign substance getting between the valve and the seat and cutting a groove in the seat or in the disk. Furthermore, the shaft 12 may be operated in both directions so that the rotary movement of the valves in grinding may be reversed whenever desired and the loosely mounted jaw plates 35 will rock and slide from side to side, and accommodate themselves to the position of the valve disks without straining or twisting them. By operating the single crank I am able to grind eight valves simultaneously and thereby save a great deal of time and labor ordinarily required to grind valves of this type.

The shaft 12 is preferably geared to the valves so that it makes one revolution to three of the valve, though, of course, this speed may be varied if desired. In the construction shown, the valves will raise and lower with every third revolution and one turn of the handle will rotate the valves twice in their grinding position and once in their raised position. When the cam shaft is removed in case of general overhauling of the engine, all of the valves may be ground at the same time, but when the cam shaft is in place, there will always be two valves held in their open position by the shaft. In this case six valves will be ground at once and after operating the crank a few moments the engine is given a half turn and this will close the two valves which have been held open and open two others, and then the operation is repeated until all the valves have been ground. By tilting the machine to one side, the valves may be examined, and those which may be properly ground first may be removed and the work continued on the others. It makes very little difference in the time required for operation whether the cam shaft is in place or not. The upper spring is stronger than the lower spring, but when the cap on which the upper spring bears enters the notch in the upper shaft there will be sufficient clearance for the upper spring to allow the lower one to open the valve. These notches are so positioned that the valves open in rotation, one at a time, and the grinding is continued until all of them are perfectly seated.

I claim as my invention:

1. A valve grinding mechanism having means for mounting it on an engine comprising a shaft, suitable supports therefor, studs geared to said shaft and having means on one end thereof for engagement with the cylinder valves, said shaft having means co-operating with the other end of said studs whereby said valves may be allowed to rise when the ends of their respective operating studs are opposite predetermined points on said shaft, whereby said valves will be opened and closed in succession during their revolving movement, and means for revolving said shaft.

2. A valve grinding mechanism having means for mounting it on an engine comprising a shaft having notches progressively arranged in its surface, suitable supports for said shaft, studs geared to said shaft and having means on one end thereof for engagement with the cylinder valves and means on the other end thereof to engage the notches in said shaft, whereby said valves may be allowed to rise when the ends of their respective operating studs engage the notches in said shaft, whereby said valves will be opened and closed in succession and during their revolving movement, and means for revolving said shaft.

3. A valve grinding mechanism comprising a shaft having means for supporting it on an engine, studs geared to said shaft to be revolved thereby, jaw plates loosely mounted in said studs and having lugs for engaging the holes in the valve disk for revolving the same with said studs, said studs being mounted to yield vertically at intervals and allow said valves to open intermittently, said loosely mounted jaw plates having longitudinal slots therein to receive pins in said studs for accommodating themselves to the position of the valves and means for revolving said shaft.

4. A valve grinding mechanism comprising blocks having means for securing them on an engine in place of the cylinder head, a shaft centrally mounted on said blocks, arms mounted on said shaft for oscillation from one side to the other of said cylinder, a shaft carried by said arms and having an operating means, studs geared to said shaft and having means for engaging the cylinder valves for rotating them on their seats, a guide mounted on one of said blocks, a bracket carried by one of said arms and a locking device mounted in said bracket and provided with a handle and having means for engaging said guide for locking said stud-carrying shaft in its working position above said valves or its inactive position at one side of said valves.

5. A valve grinding mechanism comprising a shaft having means for supporting it on an engine, said shaft having notches progressively arranged in its surface, brackets mounted on said shaft and having sockets therein, studs fitting within said sockets and springs interposed between said studs and said shaft, pinions geared to said shaft and wherein said studs are slidably mounted, said studs having means for engagement with the valve disks and the notches in said shaft allowing vertical movement of said studs as said shaft revolves.

6. A valve grinding mechanism comprising a shaft having means for mounting it on an engine, studs having means for connection with the cylinder valves and geared to said shaft, said studs being mounted to yield vertically with said valves, and said shaft having notches progressively arranged therein for intermittently allowing the raising of said valves and studs during their revolving movement and means for operating said shaft.

7. A valve grinding mechanism comprising blocks having means for securing them to an engine, brackets connected with said blocks and projecting upwardly therefrom, a shaft mounted in said brackets for oscillation therewith from one side to the other of the engine, said brackets having sockets therein, studs slidable in said sockets, springs for yieldingly holding said studs in a projected position, pinions geared to said shaft and wherein said studs are mounted to revolve therewith and move lengthwise independently thereof, and valve engaging means carried by said studs.

In witness whereof, I have hereunto set my hand this 21st day of April 1917.

THOMAS V. CUDMORE.